US 011175701B2

(12) United States Patent
Yamamoto et al.

(10) Patent No.: US 11,175,701 B2
(45) Date of Patent: Nov. 16, 2021

(54) ELECTRONIC DEVICE

(71) Applicant: FUJITSU CLIENT COMPUTING LIMITED, Kanagawa (JP)

(72) Inventors: Yasufumi Yamamoto, Kawasaki (JP); Yoshiyuki Sando, Kawasaki (JP); Kenji Suzuki, Kawasaki (JP)

(73) Assignee: FUJITSU CLIENT COMPUTING LIMITED, Kanagawa (JP)

(*) Notice: Subject to any disclaimer, the term of this patent is extended or adjusted under 35 U.S.C. 154(b) by 0 days.

(21) Appl. No.: 16/936,666

(22) Filed: Jul. 23, 2020

(65) Prior Publication Data

US 2021/0072798 A1    Mar. 11, 2021

(30) Foreign Application Priority Data

Sep. 5, 2019   (JP) .............................. JP2019-162253

(51) Int. Cl.
*G06F 1/16*   (2006.01)

(52) U.S. Cl.
CPC .......... *G06F 1/1654* (2013.01); *G06F 1/1683* (2013.01); *G06F 1/1681* (2013.01)

(58) Field of Classification Search
CPC ..... G06F 1/1632; G06F 1/1654; G06F 1/1656
See application file for complete search history.

(56) References Cited

U.S. PATENT DOCUMENTS

| | | | | |
|---|---|---|---|---|
| 6,310,767 B1* | 10/2001 | Spear | ....................... | G06F 1/16 361/679.24 |
| 8,287,285 B2* | 10/2012 | Mainville | ............ | H05K 1/0215 439/34 |
| 8,958,204 B2* | 2/2015 | Lev | ....................... | G06F 1/1656 361/679.55 |
| 9,668,388 B2* | 5/2017 | Caclard | ................ | H05K 9/0039 |
| 10,314,191 B2* | 6/2019 | Han | ...................... | H05K 7/1411 |
| 2006/0061512 A1* | 3/2006 | Asano | .................. | H01Q 1/2266 343/702 |
| 2008/0049949 A1* | 2/2008 | Snider | .................. | H05K 5/0217 381/86 |
| 2017/0068289 A1* | 3/2017 | Buxton | ................... | G06F 1/163 |

FOREIGN PATENT DOCUMENTS

| | | |
|---|---|---|
| JP | H06110579 A | 4/1994 |
| JP | 2000207060 A | 7/2000 |
| JP | 2005209868 A | 8/2005 |

(Continued)

OTHER PUBLICATIONS

Notice of Reasons for Refusal issued for the counterpart Japanese Patent Application No. 2019-162253, dated Nov. 26, 2019 (14 pages).

(Continued)

*Primary Examiner* — Adrian S Wilson
(74) *Attorney, Agent, or Firm* — Osha Bergman Watanabe & Burton LLP

(57) ABSTRACT

An electronic device includes a base member, a coupling member, and a male screw member. The base member has a female screw and is made of synthetic resin material. The coupling member is detachably coupled to a coupling target part provided in a coupling target device. The male screw member is coupled to the female screw and fixes the coupling member to the base member.

8 Claims, 10 Drawing Sheets

(56) References Cited

FOREIGN PATENT DOCUMENTS

| | | |
|---|---|---|
| JP | 2012023153 A | 2/2012 |
| JP | 2012230678 A | 11/2012 |
| JP | 2016081387 A | 5/2016 |
| JP | 2017041027 A | 2/2017 |

OTHER PUBLICATIONS

Notice of Reasons for Refusal issued for the counterpart Japanese Patent Application No. 2019-162253, dated Feb. 12, 2020 (9 pages).

\* cited by examiner

ELECTRONIC DEVICE

CROSS-REFERENCE TO RELATED APPLICATIONS

This application is based upon and claims the benefit of priority from Japanese Patent Application No. 2019-162253, filed Sep. 5, 2019, the entire contents of which are incorporated herein by reference.

FIELD

The present disclosure relates generally to an electronic device.

BACKGROUND

Conventionally, examples of electronic devices such as tablet personal computers include an electronic device that can be detachably coupled to a coupling target device such as a keyboard dock. As this type of electronic device, there is known an electronic device in which a coupling member to be detachably coupled to a coupling target part of a coupling target device is fixed to a base member (e.g., see Japanese Patent Application Laid-open No. 2017-41027).

In the above conventional electronic device, because the coupling member is fixed to the base member by a male screw member and a nut fixed to the base member by insert molding, a configuration for fixing the coupling member is complicated.

Therefore, one of objects of the present invention is to obtain an electronic device that easily simplifies a configuration for fixing a coupling member to be coupled to a coupling target part.

SUMMARY

According to an aspect of the present disclosure, an electronic device includes: a base member on which a female screw is formed, the base member being made of synthetic resin material; a coupling member that is detachably coupled to a coupling target part provided in a coupling target device; and a male screw member that is coupled to the female screw, the male screw member fixing the coupling member to the base member.

DETAILED DESCRIPTION

Hereinafter, embodiments of the present invention will be disclosed. Configurations of one or more embodiments illustrated below, and actions and effects brought about by the configurations are given as examples. The present invention can be implemented by a configuration other than the configurations disclosed in the following embodiments. In addition, at least one of various effects (including derivative effects) obtained by the configurations can be obtained according to the present invention.

Incidentally, in the present application, ordinal numbers are used only to distinguish components, members, parts, positions, directions and the like, and do not indicate an order or priority.

Figure 1:
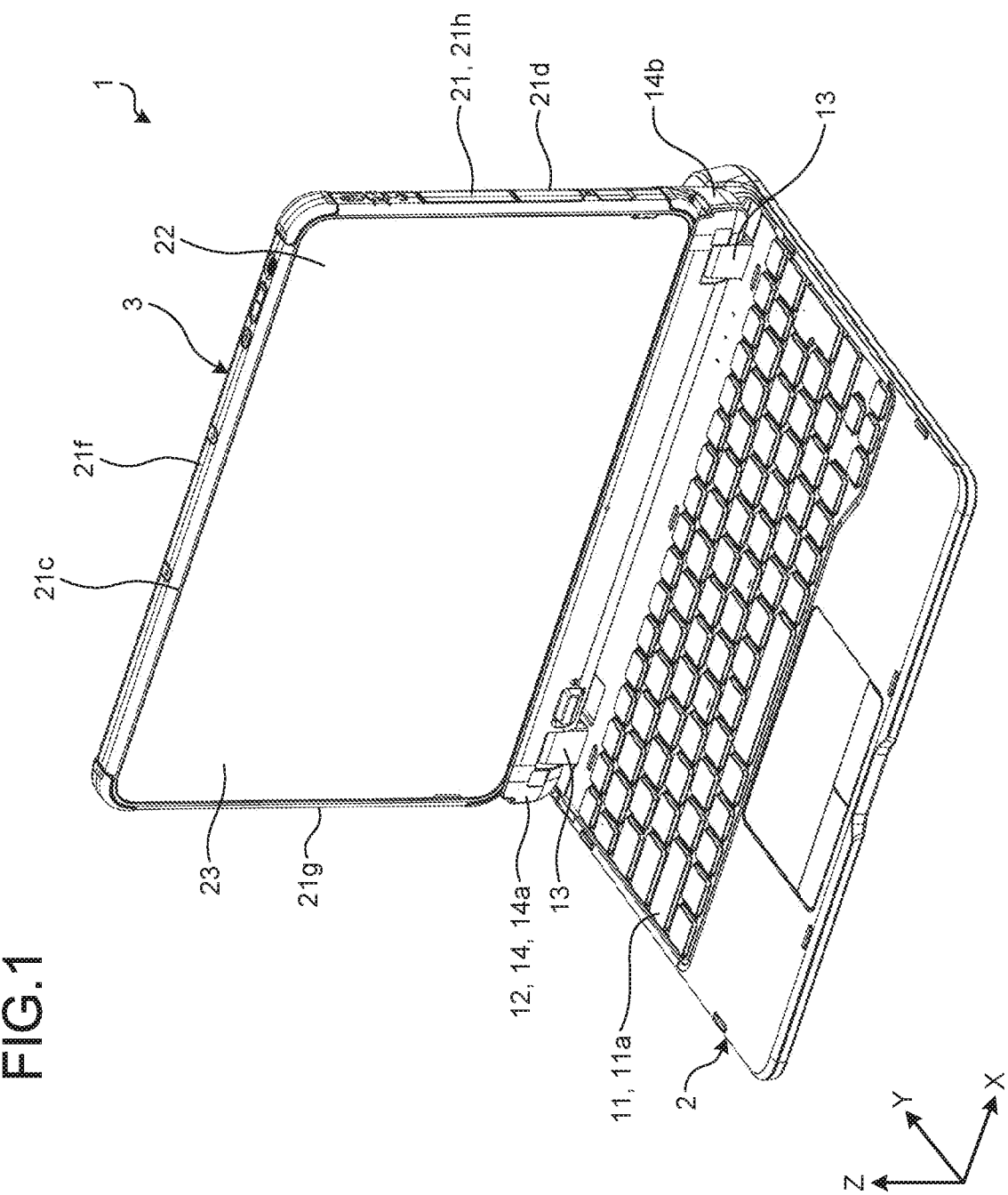
FIG. 1 is an exemplary perspective view illustrating an electronic device system according to one or more embodiments as viewed from a front side, and is a view of a state where a first electronic device and a second electronic device are coupled.
Figure 2:
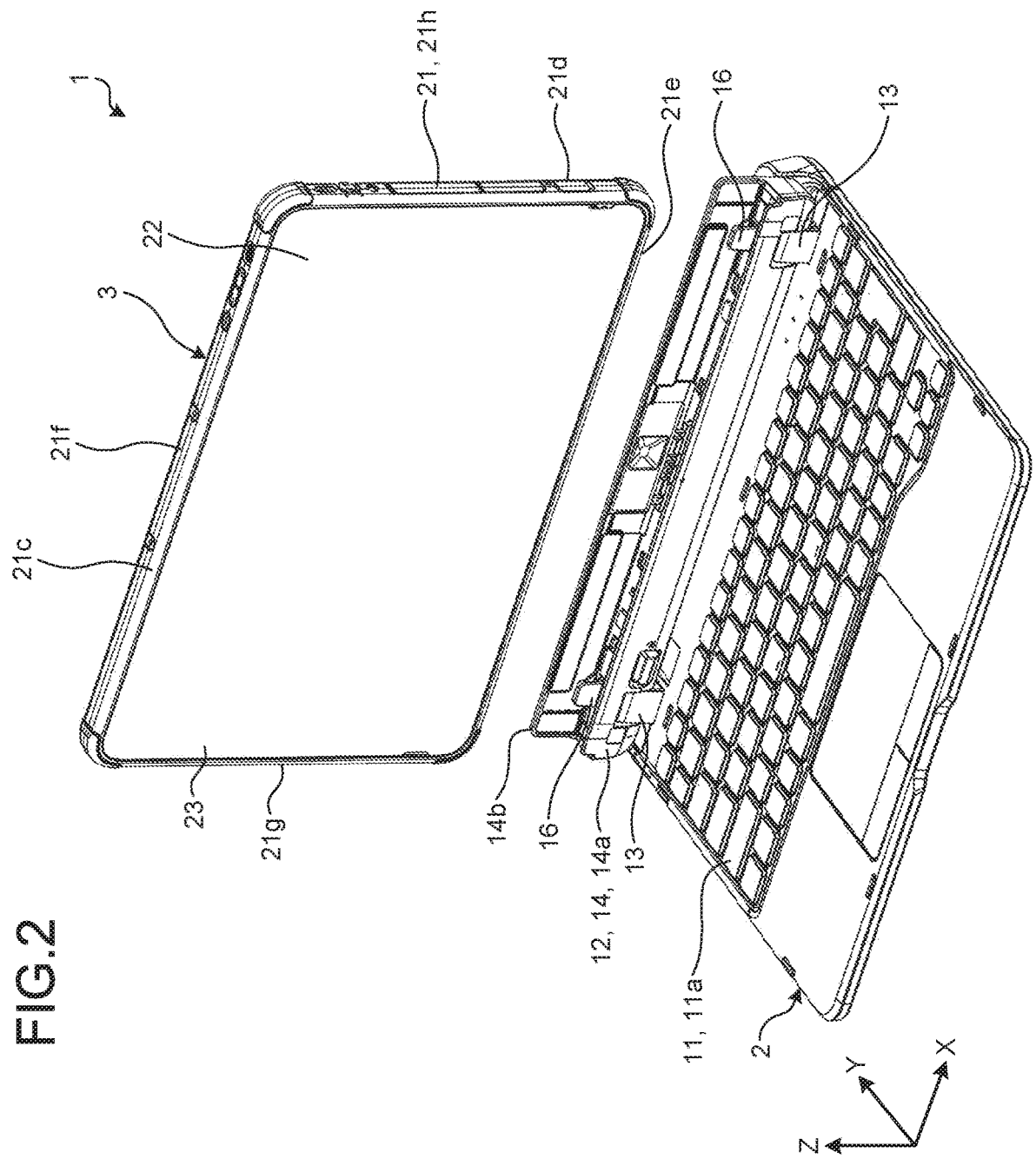
FIG. 2 is an exemplary perspective view illustrating the electronic device system according to one or more embodiments as viewed from the front side, and is a view of a state where the first electronic device and the second electronic device are separated.

FIG. 1 is an exemplary perspective view illustrating an electronic device system 1 according to one or more embodiments as viewed from a front side, and is a view of a state where a first electronic device 3 and a second electronic device 2 are coupled. FIG. 2 is an exemplary perspective view illustrating the electronic device system 1 according to one or more embodiments as viewed from the front side, and is a view of a state where the first electronic device 3 and the second electronic device 2 are separated.

As illustrated in FIGS. 1 and 2, the electronic device system 1 includes the first electronic device 3 and the second electronic device 2. The first electronic device 3 is detachably coupled to the second electronic device 2. The first electronic device 3 is an example of an electronic device, and the second electronic device 2 is an example of a coupling target device.

Hereinafter, the near side and the far side in a direction viewed from a user who uses the electronic device system 1 will be referred to as a front side (in front) and a rear side (behind), respectively, and a height direction of the electronic device system 1 and a width direction of the electronic device system 1 will be referred to also as an up-down direction and a left-right direction using a coupling mode (FIG. 1) where the first electronic device 3 is coupled to (supported by) the second electronic device 2 in an upright state. In addition, the respective drawings illustrate an X-direction, a Y-direction, and a Z-direction. The X-direction extends along the width direction of the electronic device system 1 (longitudinal direction (horizontal width direction) of the first electronic device 3), the Y-direction extends along the front-rear direction of the electronic device system 1 (thickness direction of the first electronic device 3), and the Z-direction extends along the height direction of the electronic device system 1 (lateral direction (vertical width direction) of the first electronic device 3).

The second electronic device 2 includes an input part 11 and a coupling part 12. The first electronic device 3 is configured as a tablet-type (slate-type) personal computer. The first electronic device 3 is detachably coupled to the coupling part 12 of the second electronic device 2. The first electronic device 3 is coupled to the second electronic device 2 by moving in a direction toward the second electronic device 2 (a direction opposite to the Z-direction) from a state of being removed from the second electronic device 2 (FIG. 2) (FIG. 1). In addition, the first electronic device 3 is removed from the second electronic device 2 (FIG. 2) by moving in a direction to be separated from the second electronic device 2 (the Z-direction) from the state of being coupled to the second electronic device 2 (FIG. 1).

Hereinafter, the second electronic device 2 and the first electronic device 3 will be described in detail in an order of the second electronic device 2 and the first electronic device 3.

As illustrated in FIGS. 1 and 2, the input part 11 of the second electronic device 2 includes a keyboard 11a.

Figure 3:
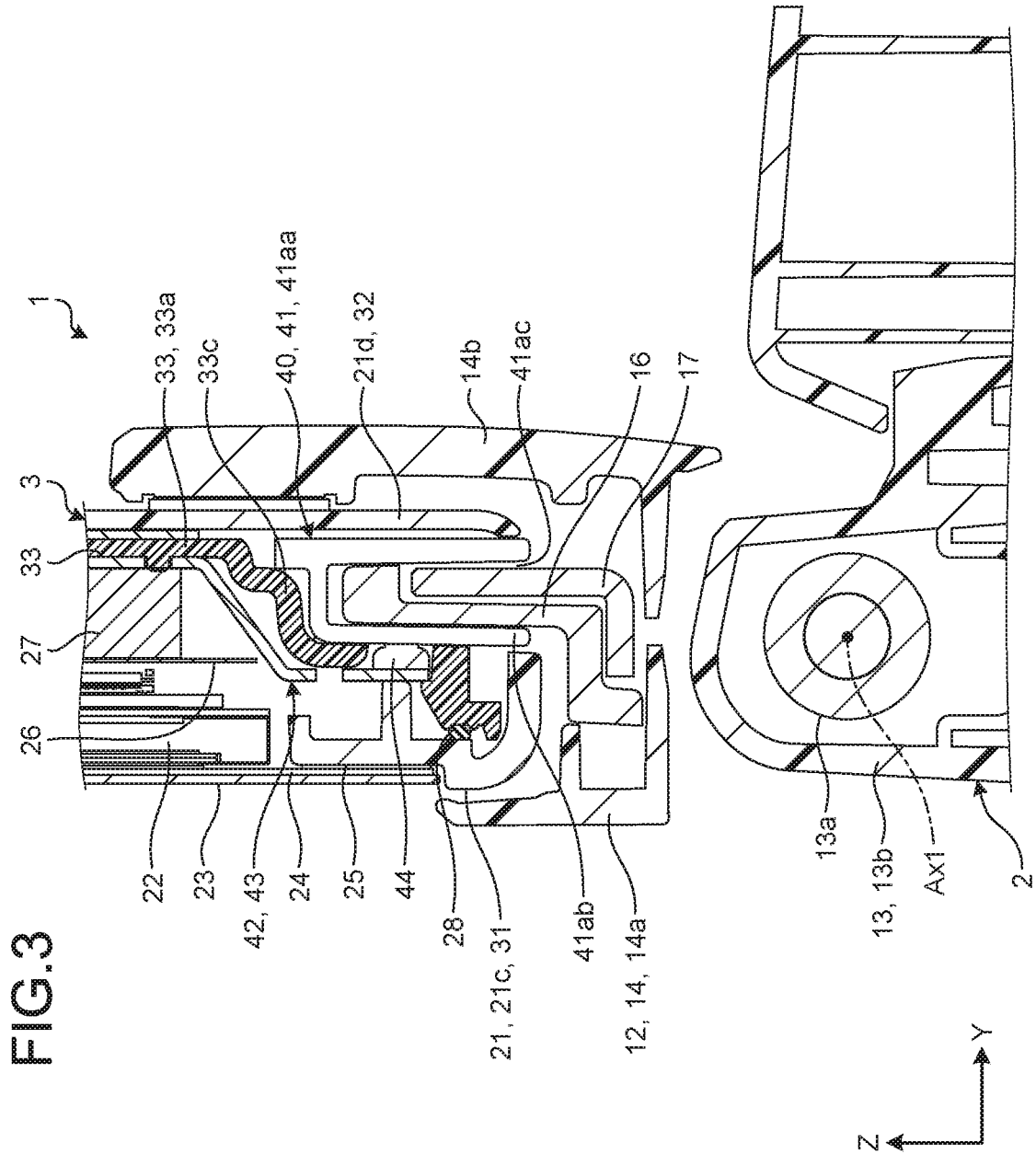
FIG. 3 is an exemplary cross-sectional view illustrating a part of the electronic device system according to one or more embodiments, and is a view of the state where the first electronic device and the second electronic device are coupled.

FIG. 3 is an exemplary cross-sectional view illustrating a part of the electronic device system 1 according to one or more embodiments, and is a view of the state where the first electronic device 3 and the second electronic device 2 are coupled.

The coupling part 12 of the second electronic device 2 is coupled to a rear end of the input part 11 through a hinge 13.

The coupling part 12 has a support part 14, a pin 16, and a hook 17. The support part 14 is supported by the hinge 13. The support part 14 is formed in a substantially rectangular parallelepiped shape that is flat in the front-rear direction and has a length in the left-right direction longer than a length in the up-down direction. The support part 14 is formed of a combination of a plurality of members including a front cover 14a and a rear cover 14b. The rear cover 14b is arranged behind the front cover 14a. The front cover 14a and the rear cover 14b are coupled to each other by a claw, a screw, or the like.

As illustrated in FIG. 3, the hinge 13 has a hinge mechanism 13a and a hinge cover 13b. The hinge mechanism 13a supports the coupling part 12 to be rotatable within a predetermined range about a rotation center Ax1.

Next, the first electronic device 3 will be described. As illustrated in FIG. 2, the first electronic device 3 has a case 21 and a display device 22 stored in the case 21.

The case 21 is formed in a substantially rectangular parallelepiped that is flat. The case 21 has a plurality of walls, for example, a front wall 21c, a rear wall 21d, a lower wall 21e, an upper wall 21f, a left wall 21g, a right wall 21h, and the like.

The front wall 21c is formed in a rectangular frame shape in which a display surface of the display device 22 is exposed. The front wall 21c includes a front surface of the case 21, and the rear wall 21d includes a rear surface of the case 21. The lower wall 21e and the upper wall 21f form a lower end and an upper end of the case 21, respectively. The left wall 21g and the right wall 21h form a left end and a right end of the case 21, respectively.

In addition, the case 21 is formed of a combination of a plurality of members including a front cover 31, a rear cover 32, and a middle cover 33 as illustrated in FIG. 3. The front cover 31 includes at least the front wall 21c, and the rear cover 32 includes at least the rear wall 21d. The middle cover 33 is fixed to at least one of the front cover 31 and the rear cover 32 in the state of being located between the front cover 31 and the rear cover 32. A seal member 28 is interposed between an outer peripheral portion of the middle cover 33 and an outer peripheral portion of the front cover 31. For example, the seal member 28 is made of acrylic rubber.

In addition, an example of the display device 22 is a liquid crystal display. Incidentally, the display device 22 is not limited to the liquid crystal display. For example, the display device 22 may be an organic electro luminescence (EL) display or the like.

A touch panel 24 is overlaid on the display surface of the display device 22. The touch panel 24 is attached (fixed) to the front cover 31 with a double-sided tape 25. The double-sided tape 25 seals a space between the touch panel 24 and the front cover 31. In addition, a transparent member 23 is overlaid on an outer surface of the touch panel 24.

In addition, the case 21 stores a circuit board 26, a conductive gasket 27, a coupling part 40, and a conductive part 42 as illustrated in FIG. 3. The circuit board 26, the conductive gasket 27, the coupling part 40, and the conductive part 42 are supported by the case 21. The circuit board 26 controls each unit of the first electronic device 3. The conductive gasket 27 is made of a conductive material, and is electrically connected to a conductive layer provided in the case 21. The conductive gasket 27 and the conductive layer are examples of a ground part of the first electronic device 3, respectively.

The coupling part 40 is detachably coupled to the pin 16 of the second electronic device 2. The conductive part 42 electrically connects the coupling part 40 to the conductive gasket 27. The coupling part 40 and the conductive part 42 are supported by the middle cover 33.

Figure 4:
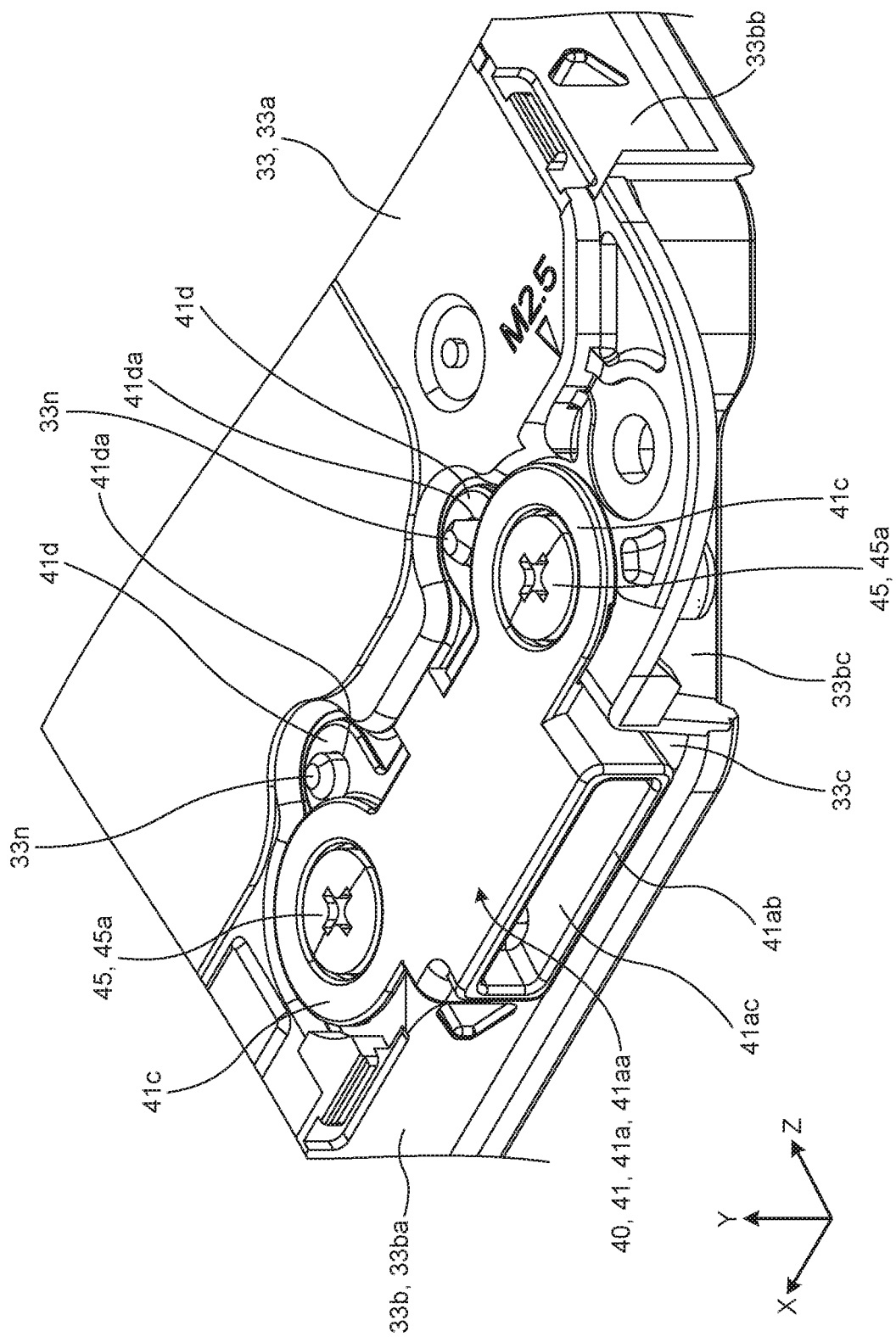
FIG. 4 is an exemplary perspective view illustrating a part of the first electronic device according to one or more embodiments as viewed from a back side.
Figure 5:
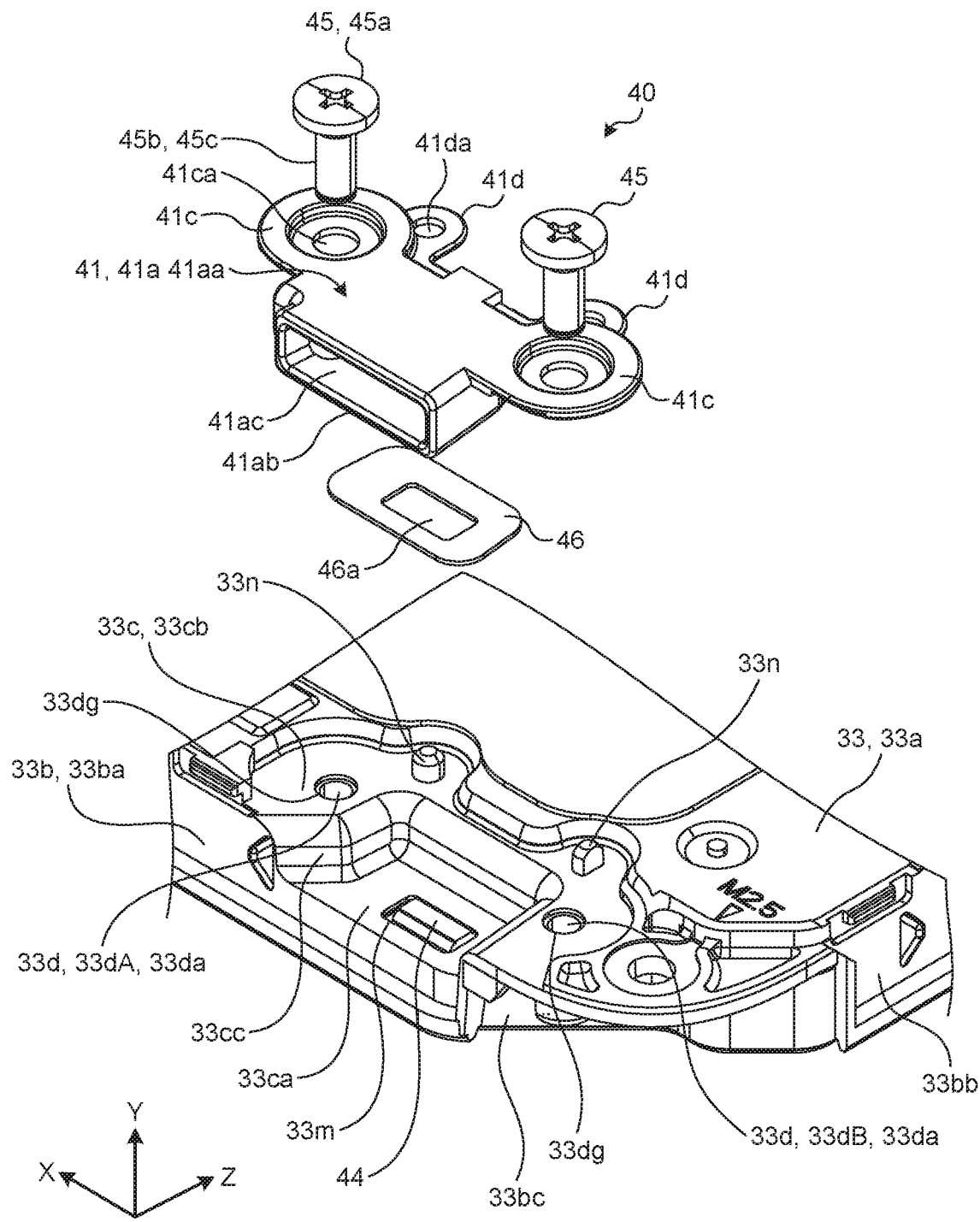
FIG. 5 is an exemplary exploded perspective view illustrating a part of the first electronic device according to one or more embodiments as viewed from the back side.
Figure 6:
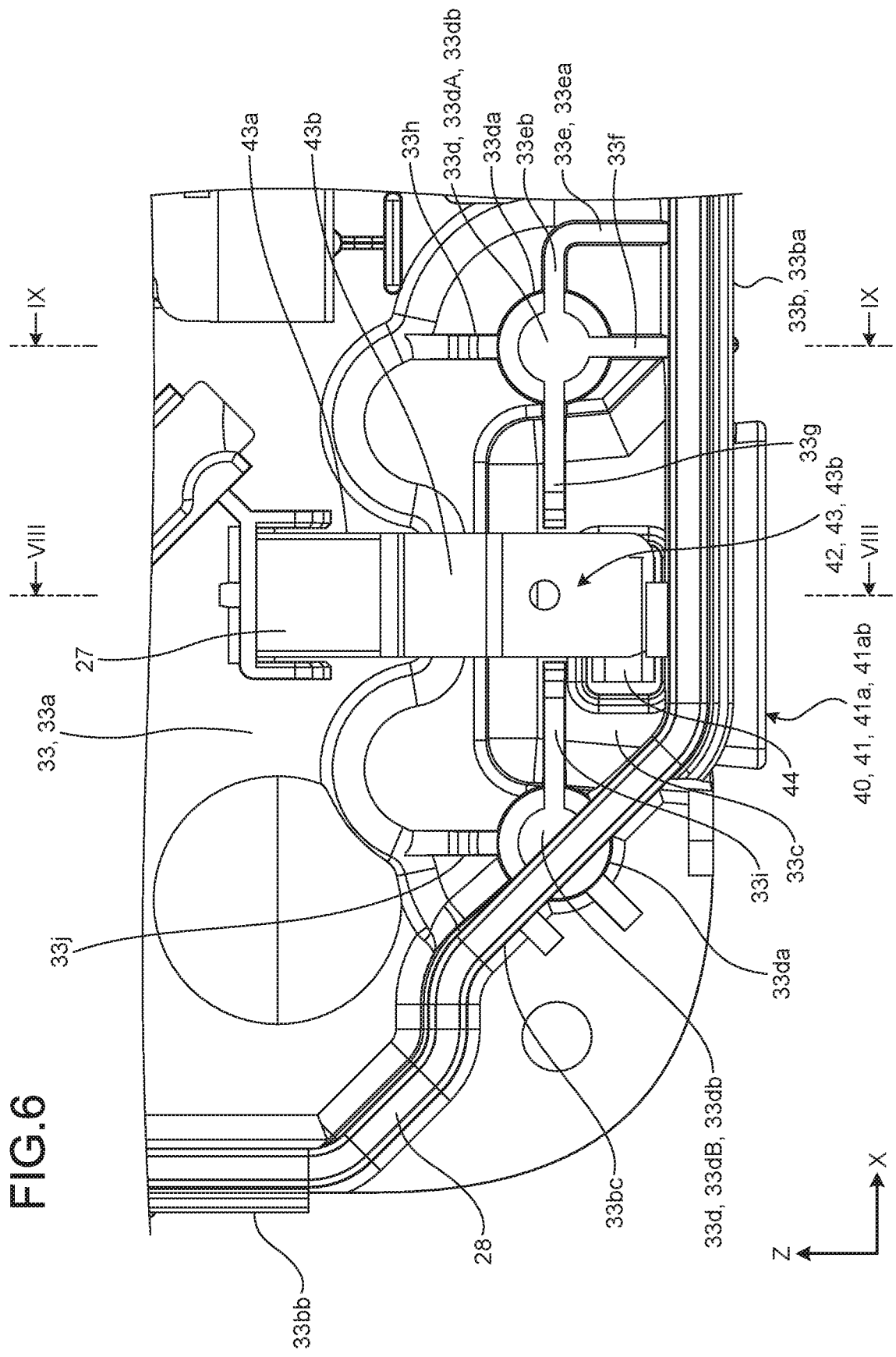
FIG. 6 is an exemplary view illustrating a part of the first electronic device according to one or more embodiments as viewed from the front side.
Figure 7:
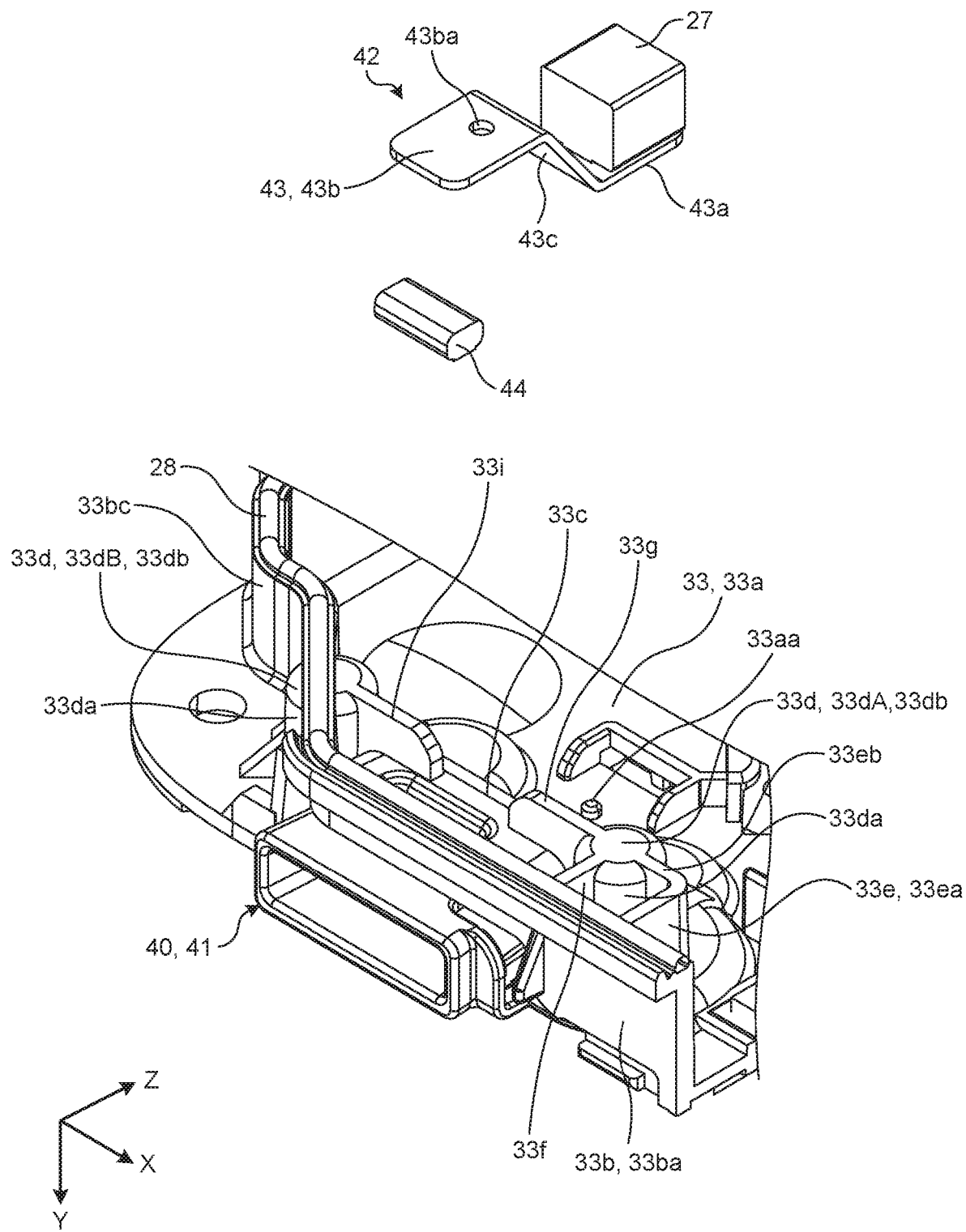
FIG. 7 is an exemplary exploded perspective view illustrating a part of the first electronic device according to one or more embodiments as viewed from the front side.
Figure 8:
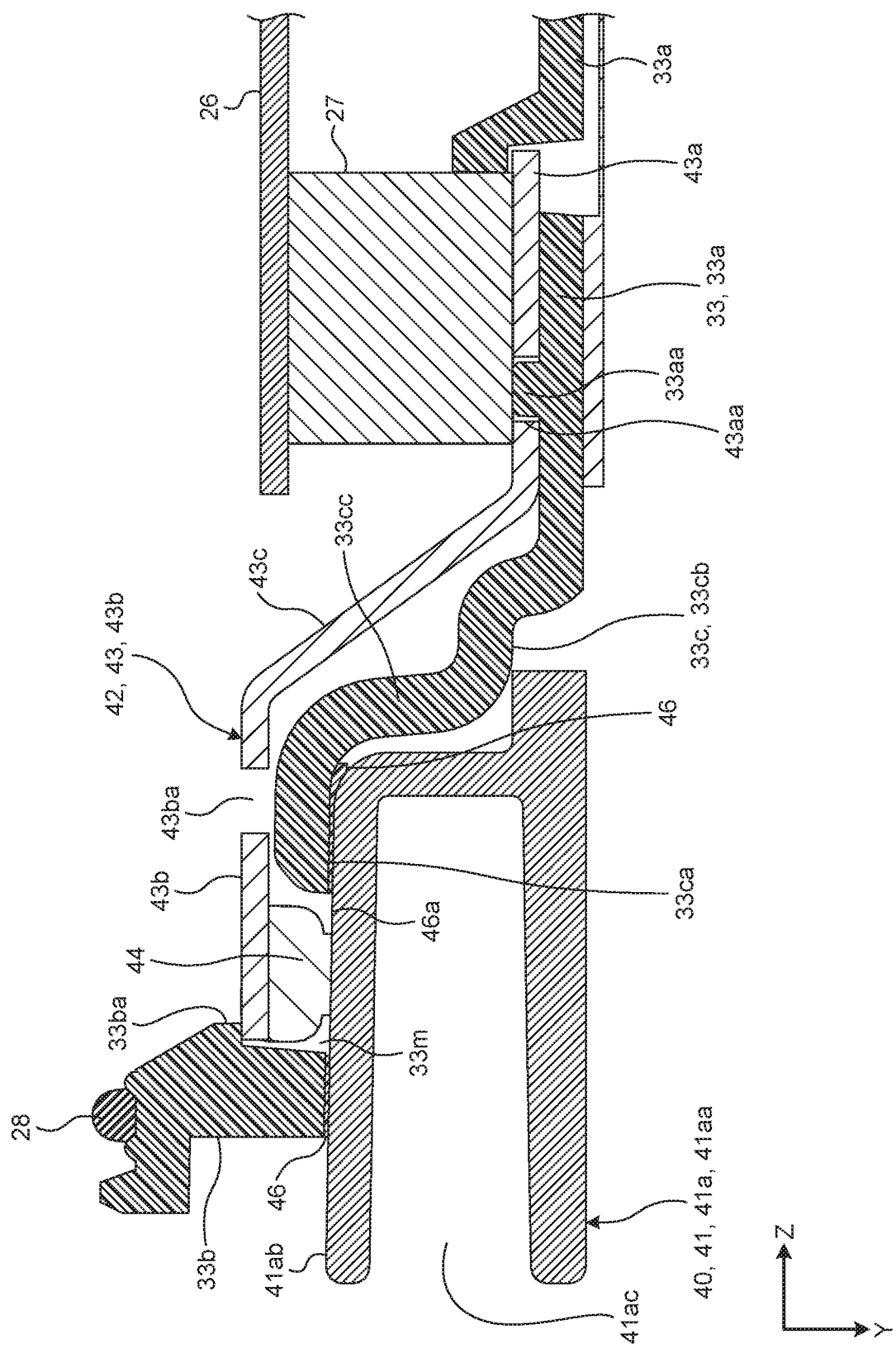
FIG. 8 is a cross-sectional view taken along the line VIII-VIII of FIG. 6.
Figure 9:
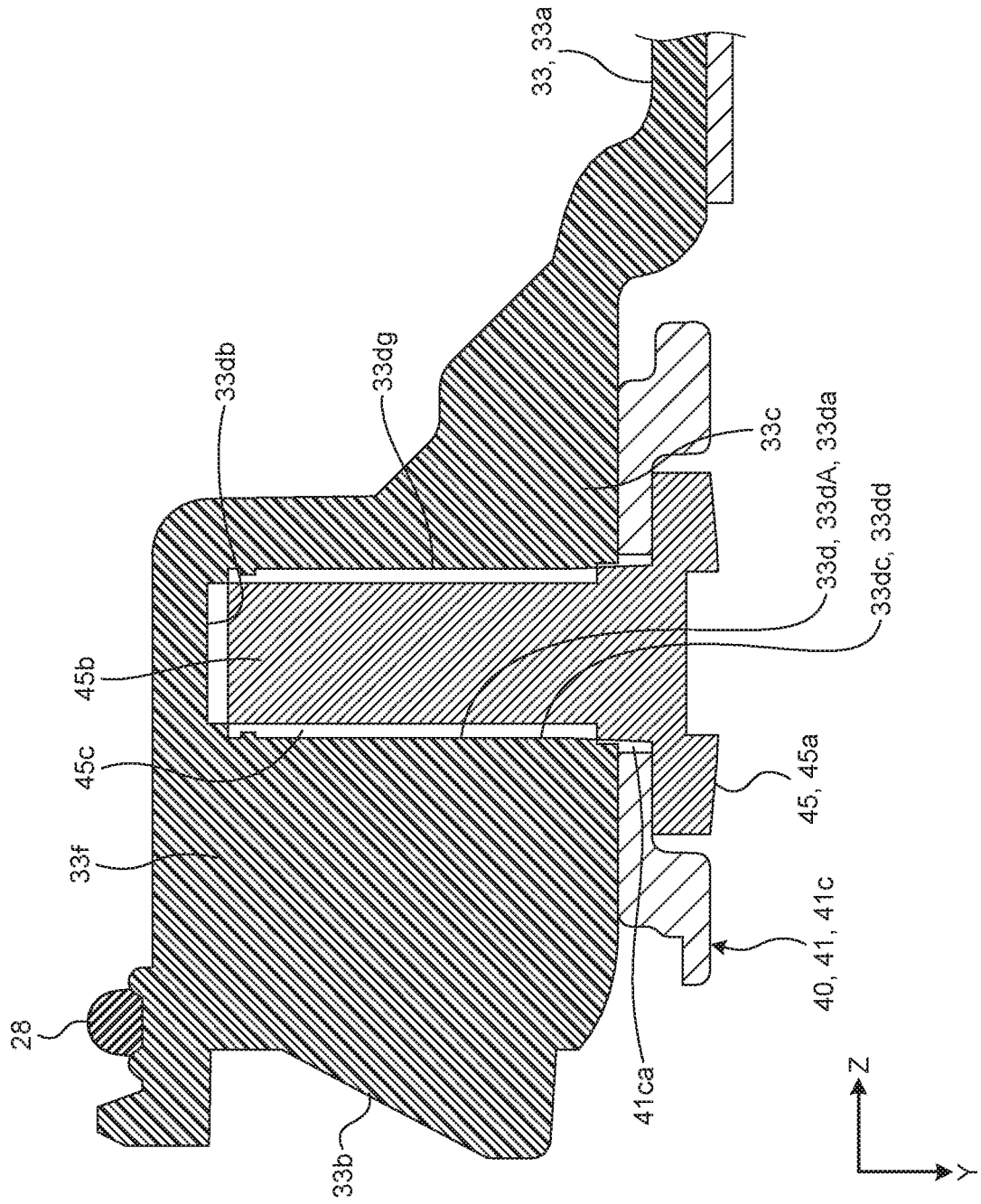
FIG. 9 is a cross-sectional view taken along the line IX-IX of FIG. 6.

Hereinafter, the middle cover 33, the coupling part 40, and the conductive part 42 will be described in detail with reference to FIGS. 3 to 9. FIG. 4 is an exemplary perspective view illustrating a part of the first electronic device 3 according to one or more embodiments as viewed from a back side. FIG. 5 is an exemplary exploded perspective view illustrating a part of the first electronic device 3 according to one or more embodiments as viewed from the back side. FIG. 6 is an exemplary view illustrating a part of the first electronic device 3 according to one or more embodiments as viewed from the front side. FIG. 7 is an exemplary exploded perspective view illustrating a part of the first electronic device 3 according to one or more embodiments as viewed from the front side. FIG. 8 is a cross-sectional view taken along the line VIII-VIII of FIG. 6. FIG. 9 is a cross-sectional view taken along the line IX-IX of FIG. 6.

As illustrated in FIGS. 4 to 8, the middle cover 33 has a base wall 33a and a standing wall 33b. The middle cover 33 is made of a synthetic resin material and has electrical insulation properties. The base wall 33a is an example of a first wall, and the standing wall 33b is an example of a second wall.

The base wall 33a is widened along the rear wall 21d. The standing wall 33b extends from the base wall 33a in a direction intersecting the base wall 33a, specifically in a direction opposite to the Y-direction, and has at least a part extending along an outer edge portion of the base wall 33a. In detail, the standing wall 33b includes a first portion 33ba, a second portion 33bb, and a third portion 33bc. The first portion 33ba extends along the outer edge portion of the base wall 33a in the direction opposite to the Z-direction. The second portion 33bb extends along the outer edge portion of the base wall 33a in a direction opposite to the X-direction. The third portion 33bc extends in a direction intersecting the first portion 33ba and the second portion 33bb, and connects the first portion 33ba and the second portion 33bb.

In addition, the middle cover 33 has a step-shaped support part 33c that straddles the base wall 33a and the standing wall 33b as illustrated in FIGS. 4 and 5. The support part 33c supports the coupling member 41 of the coupling part 40. The support part 33c has a first portion 33ca, a second portion 33cb, and a third portion 33cc. The first portion 33ca and the second portion 33cb are located in the direction opposite to the Y-direction with respect to the base wall 33a. In addition, the first portion 33ca is located in the direction opposite to the Y-direction with respect to the second portion 33cb. The third portion 33cc connects the first portion 33ca and the second portion 33cb. The first portion 33ca, the second portion 33cb, and the third portion 33cc are walls, respectively.

The first portion 33ca is provided with a through-hole 33m penetrating through the first portion 33ca in the Y-direction. The through-hole 33m is an example of an opening portion. Incidentally, the opening portion may be a notch.

The second portion 33cb is provided with two positioning protrusions 33n protruding in the Y-direction.

In addition, the support part 33c is provided with two (a plurality of) bosses 33d as illustrated in FIGS. 6 to 8. The two bosses 33d are a boss 33dA and a boss 33dB. The boss 33dA and the boss 33dB are arranged side by side with an interval in the X-direction. The boss 33d is included in the middle cover 33. That is, the boss 33d is made of the synthetic resin material.

The boss 33d has a cylindrical portion 33da and an end wall 33db that closes one end of the cylindrical portion 33da. That is, the boss 33d is formed in a bag shape, and the boss 33d is provided with a concave (bottomed) hole 33dg. The hole 33dg is open in the Y-direction. Specifically, the hole 33dg is open in the second portion 33cb. A female screw 33dd is formed on an inner peripheral surface 33dc of the cylindrical portion 33da. The female screw 33dd is included in the middle cover 33. That is, the female screw 33dd is integrally molded with the other portion of the middle cover 33 and forms one member with the other portion. Therefore, the female screw 33dd is made of a synthetic resin material similarly to the other portion of the middle cover 33. The inner peripheral surface 33dc and the female screw 33dd surround the hole 33dg. That is, the inner peripheral surface 33dc and the female screw 33dd form the hole 33dg.

As illustrated in FIG. 6, the boss 33dA is provided apart from the standing wall 33b, and the boss 33dB is provided in the third portion 33bc of the standing wall 33b.

In addition, the middle cover 33 has a plurality of ribs 33e to 33j connected to the boss 33d as illustrated in FIGS. 6 and 7. The plurality of ribs 33e to 33j protrudes from the support part 33c in the direction opposite to the Y-direction.

The rib 33e has a portion 33ea connected to the first portion 33ba of the standing wall 33b and a portion 33eb connected to the boss 33dA, and connects the boss 33dA and the standing wall 33b. The rib 33f connects the boss 33dA and the standing wall 33b.

As illustrated in FIGS. 4 and 5, the coupling part 40 includes the coupling member 41. The coupling member 41 is detachably coupled to the pin 16 provided on the second electronic device 2. The coupling member 41 is made of a conductive metal material (conductive material).

The coupling member 41 includes a tubular portion 41a, two (a plurality of) fixing portions 41c, and two (a plurality of) positioning portions 41d.

The tubular portion 41a has a rectangular parallelepiped appearance. The tubular portion 41a has walls 41aa, 41ab that are located with an interval therebetween in the Y-direction. Outer surfaces of the walls 41aa and 41ab are formed to be flat. The wall 41aa is located in the Y-direction of the wall 41ab. In addition, the tubular portion 41a is provided with an opening portion 41ac that is open in the direction opposite to the Z-direction. The pin 16 and the hook 17 of the second electronic device 2 are inserted into the opening portion 41ac (FIG. 3).

The fixing portion 41c is provided with a through-hole 41ca. The positioning portion 41d is provided with through-holes 41da in which the positioning protrusions 33n are inserted. Accordingly, positioning of the coupling member 41 is performed.

The coupling member 41 is fixed to the support part 33c by a male screw member 45. The male screw member 45 has a head portion 45a, a shaft portion 45b extending from the head portion 45a in the direction opposite to the Y-direction, and a male screw 45c provided in the shaft portion 45b. As illustrated in FIG. 9, the shaft portion 45b is inserted into the through-hole 41ca of the fixing portion 41c, and the male screw 45c is coupled to the female screw 33dd of the boss 33d in a state where the fixing portion 41c is sandwiched between the head portion 45a and the support part 33c Here, the female screw 33dd is formed, for example, by screwing the male screw member 45 into the boss 33d. That is, the male screw member 45 is a tapping screw, and the boss 33d is a tapping boss.

As illustrated in FIGS. 6 to 8, the conductive part 42 electrically connects the coupling member 41 and the conductive gasket 27. In detail, the conductive part 42 has a sheet metal member 43 and a conductive gasket 44 having conductivity. The sheet metal member 43 is an example of a first member, and the conductive gasket 44 is an example of a second member.

The sheet metal member 43 is made of a conductive metal material. The sheet metal member 43 is fixed to the middle cover 33 and electrically connected to the conductive gasket 27. In detail, the sheet metal member 43 has a first portion 43a, a second portion 43b, and a third portion 43c. The first portion 43a is provided with a through-hole 43aa. A positioning protrusion 33aa protruding from the base wall 33a is inserted into the through-hole 43aa. The first portion 43a is fixed to the base wall 33a. In addition, the base wall 33a is overlaid on the conductive gasket 27, and is electrically connected to the conductive gasket 27. The second portion 43ab is located on a side in the direction opposite to the Y-direction of the first portion 33ca of the support part 33c. In addition, the second portion 43ab is provided with a through-hole 43ba. A distal end of the second portion 43ab is supported by a claw 33bd provided on the standing wall 33b. The third portion 43ac extends in a direction intersecting the first portion 43a and the second portion 43b, and connects the first portion 43a and the second portion 43b.

The conductive gasket 44 is inserted into the through-hole 33m of the support part 33c and is interposed between the second portion 43ab of the sheet metal member 43 and the wall 41ab of the coupling member 41. The conductive gasket 44 comes into contact with the second portion 43ab and the wall 41ab. The conductive gasket 44 is made of a conductive metal material.

In addition, a double-sided adhesive tape 46 is interposed between the periphery of the through-hole 33m in the middle cover 33 and the wall 41ab of the coupling member 41 as illustrated in FIGS. 5 and 8. The double-sided adhesive tape 46 is provided with a through-hole 46a, and the conductive gasket 44 is inserted into the through-hole 46a. The double-sided adhesive tape 46 attaches (fixes) the coupling member 41 to the middle cover 33, and seals a space between the periphery of the through-hole 33m in the middle cover 33 and the wall 41ab of the coupling member 41. The double-sided adhesive tape 46 is an example of a seal member.

As described above, the first electronic device 3 (electronic device) includes: the middle cover 33 (base member) on which the female screw 33dd is formed and that is made of the synthetic resin material; the coupling member 41 that is detachably coupled to the pin 16 (coupling target part) provided in the second electronic device 2 (coupling target device); and the male screw member 45 that is coupled to the female screw 33dd and fixes the coupling member 41 to the middle cover 33.

According to such a configuration, for example, the number of components for fixing of the coupling member 41 can be reduced as compared with a configuration in which a female screw is fixed to a middle cover as a separated component (nut) from the middle cover, and thus, the configuration for fixing the coupling member 41 is easily simplified.

In addition, for example, the middle cover 33 is provided with the concave hole 33dg, and the female screw 33dd forms the hole 33dg.

According to such a configuration, for example, it is possible to prevent water or the like from passing through the hole 33dg and entering the inside of the first electronic device 3 since the hole 33dg has the concave shape. That is, waterproofness of the first electronic device 3 can be improved.

In addition, for example, the first electronic device 3 includes the conductive gasket 27 (ground part), and the conductive part 42 electrically connecting the coupling member 41 and the conductive gasket 27. The middle cover 33 is provided with the through-hole 33m (opening portion) into which a part of the conductive part 42 is inserted.

According to such a configuration, for example, static electricity which has been transmitted from the pin 16 (coupling target part) to the coupling member 41 can be transmitted to the conductive gasket 27 via the conductive part 42. Therefore, it is possible to prevent the static electricity from being transmitted to an electronic component in the first electronic device 3, and thus, it is possible to achieve stabilization of an operation of each unit of the first electronic device 3.

In addition, for example, the conductive part 42 includes: the sheet metal member 43 (first member) fixed to the middle cover 33 and electrically connected to the conductive gasket 27; and the conductive gasket 44 (second member) inserted into the through-hole 33m and interposed between the sheet metal member 43 and the coupling member 41.

According to such a configuration, the conductive gasket 44 is easily inserted into the through-hole 33m.

In addition, the first electronic device 3 includes the double-sided adhesive tape 46 (seal member), for example. The double-sided adhesive tape 46 seals the space between the periphery of the through-hole 33m (opening portion) in the middle cover 33 and the coupling member 41.

According to such a configuration, for example, it is possible to prevent water or the like from passing through the through-hole 33m and entering the inside of the first electronic device 3. That is, waterproofness of the first electronic device 3 can be improved.

In addition, for example, the middle cover 33 has: the base wall 33a (first wall); the standing wall 33b (second wall) that extends from the base wall 33a (first wall) in the direction intersecting the base wall 33a and has at least a part extending along the outer edge portion of the base wall 33a;

and the boss 33dB that is provided with the female screw 33dd on the inner peripheral surface 33dc and is provided in the standing wall 33b.

According to such a configuration, because the boss 33dB is reinforced by the standing wall 33b, the deformation of the boss 33dB can be suppressed.

In addition, for example, the middle cover 33 has ribs 33e and 33f which are provided on the base wall 33a and straddle the standing wall 33b and the boss 33dA.

According to such a configuration, because the boss 33dA is reinforced by the ribs 33e and 33f and the standing wall 33b, the deformation of the boss 33dA can be suppressed.

Figure 10:
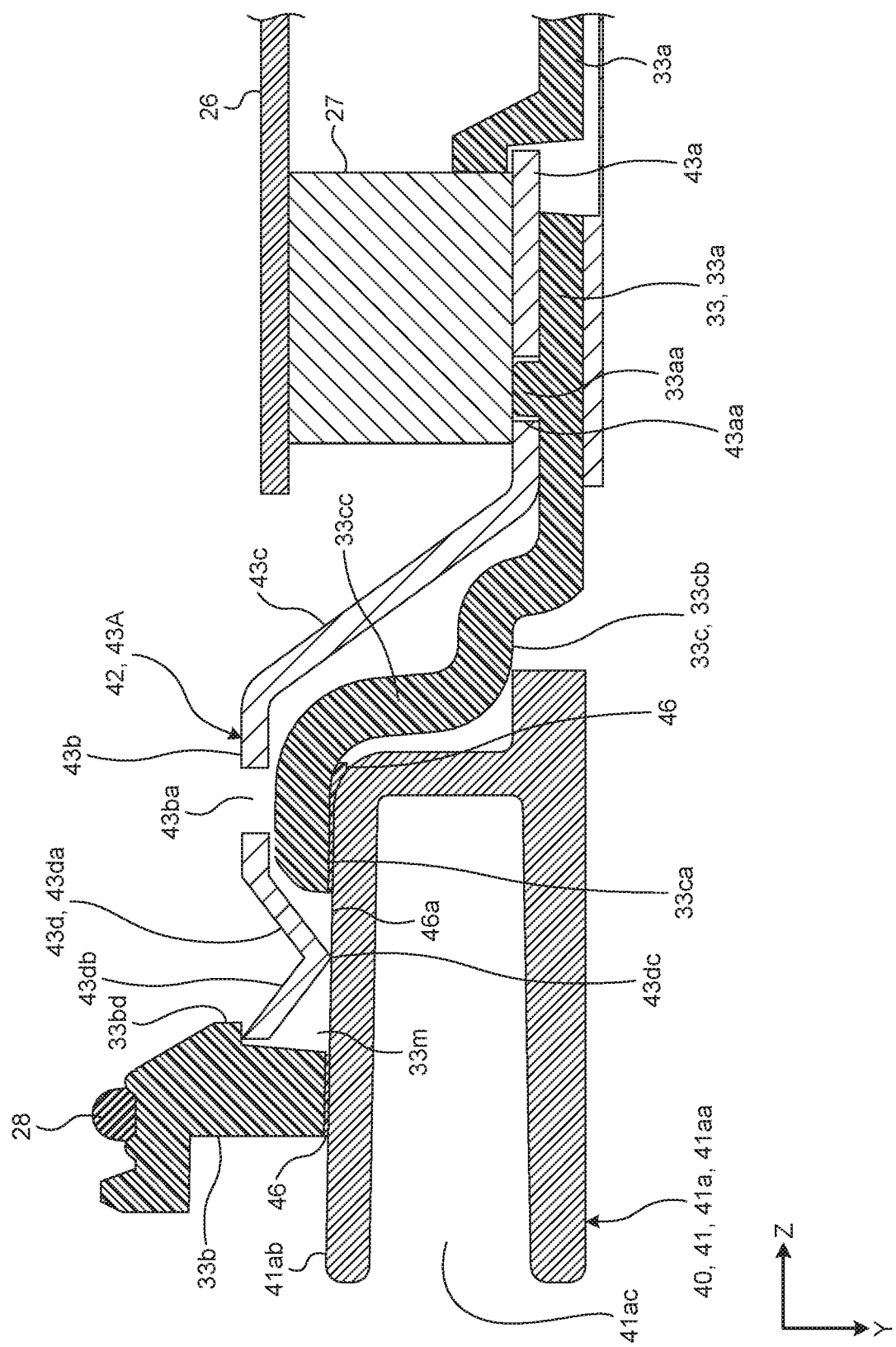
FIG. 10 is a cross-sectional view illustrating a part of a first electronic device according to a modification of one or more embodiments.

Next, a modification of the above embodiments will be described with reference to FIG. 10. FIG. 10 is a cross-sectional view illustrating a part of the first electronic device 3 according to the modification of one or more embodiments. In the present modification, the conductive part 42 has a sheet metal member 43A instead of the sheet metal member 43. In addition, the conductive part 42 is not provided with the conductive gasket 44.

The sheet metal member 43A has the first portion 43a, the second portion 43b, and the third portion 43c similarly to the sheet metal member 43. However, the second portion 43b of the sheet metal member 43A is provided with an elastic portion 43d. The elastic portion 43d is a leaf spring, and has plate portions 43da and 43db. The plate portions 43da and 43db are inclined with respect to the Y-direction so as to come closer to each other as proceeding in the Y-direction. The plate portion 43da is connected to the second portion 43b, and the plate portion 43db is supported by the claw 33bd. The plate portions 43da and 43db are inserted into the through-holes 33m and 46a. Further, a contact portion 43dc configured using an intersection between the plate portion 43da and the plate portion 43db comes into contact with the wall 41ab of the coupling member 41 and elastically presses the coupling member 41.

As described above, for example, the conductive part 42 has: the first portion 43a (fixing portion) fixed to the middle cover 33; and the elastic portion 43d which is connected to the first portion 43a, is inserted into the through-hole 33m, comes into contact with the coupling member 41, and elastically presses the coupling member 41 in the present modification.

According to such a configuration, it is possible to suppress an increase in the number of components of the conductive part 42.

Incidentally, the example in which the second electronic device 2 includes the input part 11 has been illustrated in the above embodiment, but the invention is not limited thereto. For example, the second electronic device 2 does not necessarily include the input part 11. In addition, the example in which the first electronic device 3 is configured as the tablet-type (slate-type) personal computer has been illustrated, but the invention is not limited thereto. For example, the first electronic device 3 may be a smartphone, a mobile phone, a video display device, a television receiver, a game console, an information storage device, or the like. Further, the second electronic device 2 may be a tablet-type (slate-type) personal computer, a smartphone, a mobile phone, a video display device, a television receiver, a game console, an information storage device, or the like, and the first electronic device 3 may be configured to include the input part 11.

In addition, the example in which the female screw 33dd is formed by screwing the male screw member 45 has been illustrated in the above embodiment, but the invention is not limited thereto. For example, the female screw 33dd may be formed by machining before the coupling with the male screw member 45.

According to the above aspect of the present invention, it is possible to obtain the electronic device that easily simplifies the configuration for fixing the coupling member to be coupled to the coupling target part.

While certain embodiments have been described, these embodiments have been presented by way of example only, and are not intended to limit the scope of the inventions. Indeed, one or more embodiments described herein may be embodied in a variety of other forms; furthermore, various omissions, substitutions, combinations, and changes may be made without departing from the spirit of the inventions. In addition, specifications such as configurations and shapes (structure, kind, direction, form, size, length, width, thickness, height, number, arrangement, position, material, etc.) may be appropriately changed for implementation.

What is claimed is:

1. An electronic device comprising:
   a base member on which a female screw is formed, wherein the base member is made of synthetic resin material;
   a coupling member that is detachably coupled to a coupling target part provided in a coupling target device;
   a male screw member that is coupled to the female screw, the male screw member fixing the coupling member to the base member;
   a ground part;
   a conductive part that electrically connects the coupling member and the ground part; and
   a seal member, wherein
   the base member is provided with an opening portion into which a part of the conductive part is inserted,
   the opening portion includes a through-hole, and
   the seal member seals a space between the coupling member and a periphery of the opening portion in the base member.

2. The electronic device according to claim 1, wherein the base member is provided with a concave hole, and the female screw forms the concave hole.

3. The electronic device according to claim 1, wherein the conductive part includes:
   a first member fixed to the base member and electrically connected to the ground part; and
   a second member inserted into the opening portion and interposed between the first member and the coupling member.

4. The electronic device according to claim 1, wherein the conductive part includes:
   a fixing portion fixed to the base member; and
   an elastic portion that is connected to the fixing portion, is inserted into the opening portion, and comes into contact with the coupling member to elastically press the coupling member.

5. The electronic device according to claim 1, wherein the base member includes:
   a first wall;
   a second wall that extends from the first wall in a direction intersecting the first wall, the second wall having at least a part extending along an outer edge portion of the first wall; and
   a boss that is provided with the female screw on an inner peripheral surface, wherein the boss is provided in the second wall.

6. The electronic device according to claim 1, wherein the base member includes:
   a first wall;
   a second wall that has at least a part extending along an outer edge portion of the first wall, the second wall extending from the first wall in a direction intersecting the first wall;
   a boss that is provided with the female screw on an inner peripheral surface; and
   a rib that is provided on the first wall and straddles the second wall and the boss.

7. The electronic device according to claim 1, wherein the seal member is provided with another through-hole into which the conductive part is inserted.

8. The electronic device according to claim 1, wherein the seal member is a double-sided adhesive tape that attaches the coupling member to the base member.

* * * * *